United States Patent
Zueger et al.

(10) Patent No.: US 8,996,733 B2
(45) Date of Patent: Mar. 31, 2015

(54) ALLOCATION OF AN OPERATING ADDRESS TO A BUS-COMPATIBLE OPERATING DEVICE FOR LUMINOUS MEANS

(75) Inventors: Patrick Zueger, Buttikon (CH); Andre Mitterbacher, Dornbirn (AT); Reto Sprenger, Siebnen (CH); Markus Kuenzli, Glarus (CH); Reinhard Boeckle, Maeder (AT); Roger Kistler, Glarus (CH)

(73) Assignee: Tridonic GmbH & Co. KG (AT)

( * ) Notice: Subject to any disclaimer, the term of this patent is extended or adjusted under 35 U.S.C. 154(b) by 74 days.

(21) Appl. No.: 13/056,361

(22) PCT Filed: Jul. 23, 2009

(86) PCT No.: PCT/EP2009/005363
§ 371 (c)(1),
(2), (4) Date: Apr. 13, 2011

(87) PCT Pub. No.: WO2010/012417
PCT Pub. Date: Feb. 4, 2010

(65) Prior Publication Data
US 2012/0102235 A1  Apr. 26, 2012

(30) Foreign Application Priority Data
Jul. 29, 2008 (DE) .................. 10 2008 035 22
Nov. 6, 2008 (DE) .................. 10 2008 056 164

(51) Int. Cl.
*H05B 37/02* (2006.01)
*G06F 3/00* (2006.01)

(52) U.S. Cl.
CPC .............. *G06F 3/00* (2013.01); *H05B 37/0245* (2013.01); *H05B 37/0254* (2013.01); *H05B 37/0272* (2013.01)
USPC ............................................. 710/4; 315/152

(58) Field of Classification Search
CPC ............... H05B 41/38; H05B 37/0254; H05B 37/0272; H05B 37/0245
USPC ............................ 340/3.5; 361/91.6; 315/152
See application file for complete search history.

(56) References Cited

U.S. PATENT DOCUMENTS

| | | | | |
|---|---|---|---|---|
| 6,831,569 | B2 * | 12/2004 | Wang et al. | 340/9.16 |
| 6,990,394 | B2 * | 1/2006 | Pasternak | 700/295 |
| 7,619,539 | B2 * | 11/2009 | Veskovic et al. | 340/4.3 |
| 7,936,281 | B2 * | 5/2011 | Cash et al. | 340/9.1 |
| 2005/0179404 | A1 * | 8/2005 | Veskovic et al. | 315/291 |
| 2006/0125426 | A1 * | 6/2006 | Veskovic et al. | 315/312 |
| 2006/0202851 | A1 | 9/2006 | Cash et al. | |
| 2007/0018783 | A1 * | 1/2007 | Erhardt | 340/3.5 |
| 2008/0092075 | A1 * | 4/2008 | Jacob et al. | 715/771 |
| 2009/0116579 | A1 * | 5/2009 | Abraham et al. | 375/295 |

(Continued)

FOREIGN PATENT DOCUMENTS

DE   102006046489   4/2008

*Primary Examiner* — Ernest Unelus
(74) *Attorney, Agent, or Firm* — Fish & Tsang LLP

(57) ABSTRACT

The invention relates to a method for allocating an operating address to an operating device for luminous means, in which the operating address is transmitted to the operating device in digitally coded form via an interface which is configured to connect a light sensor. The operating address is allocated by a user using a handheld device to transmit optical digital signals to a light sensor or infrared sensor which is connected to the interface.

10 Claims, 1 Drawing Sheet

(56) References Cited

U.S. PATENT DOCUMENTS

| | | | |
|---|---|---|---|
| 2010/0117621 A1* | 5/2010 | Veskovic et al. | 323/318 |
| 2010/0225452 A1* | 9/2010 | Murdoch | 340/10.5 |
| 2010/0246082 A1* | 9/2010 | Chitta et al. | 361/91.6 |

* cited by examiner

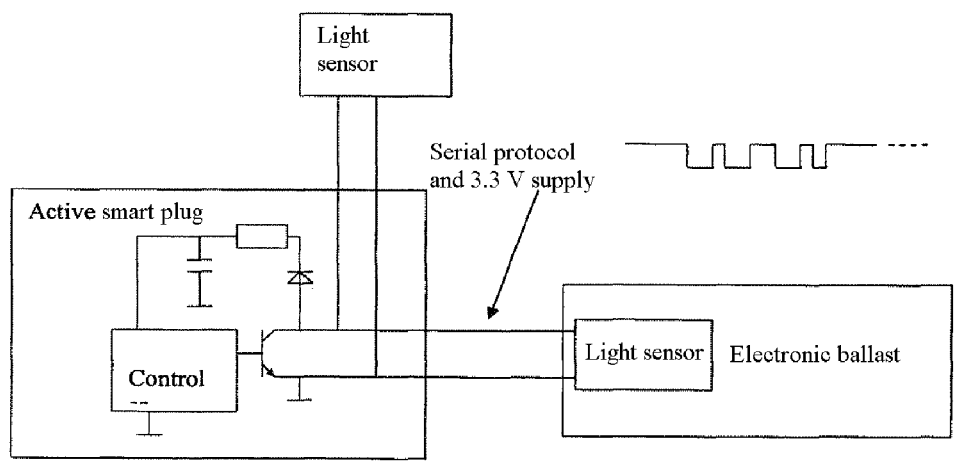

ALLOCATION OF AN OPERATING ADDRESS TO A BUS-COMPATIBLE OPERATING DEVICE FOR LUMINOUS MEANS

The present invention relates to allocation of an operating address to an operating device for luminous means.

It is usual during production to allocate a source address to bus-compatible and addressable operating devices for luminous means, for example EVGs for gas discharge lamps or light emitting diodes. For the purpose of logical grouping of luminous means during application, a shorter operating address is then allocated via which it is intended that the luminous means or the associated operating device can be addressed via a bus after installation.

It is known from EP 149239 A1 as prior art to carry out an address allocation via an ohmic resistor inserted at the smart input.

According to the DALI industry standard, each operating device must have an individual address. During installation, this address must then be correlated with the physical position of the luminous means.

Each luminaire is then connected to one or more control devices. The control parameters can have:
group association,
remote control numbers,
dimming level,
dimming speed,
light scenes etc.

The installer individually stores the connection parameters and the control parameters for each luminaire, which signifies a great deal of work.

The invention simplifies this allocation process.

This object is achieved by the features of the independent claims. The dependent claims advantageously develop the central idea of the invention.

The invention provides a method for the allocation of an operating address to an operating device for luminous means, in which the operating address is transmitted to the operating device in digitally coded form via an interface that is configured to connect a light sensor. That is to say, it is possible for a unidirectional or bidirectional data exchange to be performed with the aid of an active or passive light sensor at the same interface, and/or to supply said light sensor with electrical energy.

The allocation of the operating address can be performed in this case by a user using a handheld device to transmit optical digital signals to a light sensor or IR sensor connected to the interface.

The allocation of the operating address can alternatively be performed by connecting an active plug-in submodule (plug) to the interface.

The plug can be supplied with voltage from the operating device via the interface.

The operating device can provide a voltage for supplying the light sensor and/or the light sensor interface.

The allocation of the operating address can be performed by connecting a programming device to the interface.

The operating device can confirm the successful address allocation and address storage optically, acoustically and/or via a connected bus.

The invention also relates to a system having an operating device with a light sensor interface, which can selectively be set into a programming mode in order to carry out a method as claimed in one of the preceding claims.

It is provided in the case of the invention to allocate an operating address to an operating device in the a corresponding item of information from is transmitted to a light sensor interface digitally, for example via infrared. In particular, this can be performed in a fashion proceeding from an infrared remote control as handheld device to an infrared receiver of the operating device. The infrared receiver can, for example, be connected to the operating device via an input for a daylight sensor or ambient light sensor. Thus, in accordance with this exemplary embodiment, the invention implies a light sensor that is sensitive to infrared. The transmission is performed in the non-visible region (for example infrared).

The invention provides in this case for the address to be transmitted in digitally coded form. As mentioned, this can be performed by a type of infrared remote control and an infrared sensor. Alternatively, a smart plug, that is to say a type of digital memory, or a controller can be connected to the light sensor input in order to transmit the digital information.

However, the transmission can also be performed in the visible region. In this case, a corresponding item of information can be transmitted to a light sensor interface via a daylight sensor or other brightness sensor. In particular, this can be performed in a fashion proceeding from a remote control with a laser or an LED as transmitter to a light receiver of the operating device. The light receiver can, for example, be connected to the operating device via an input for a daylight sensor.

Alternatively, instead of the smart plug it is also possible to connect a programming device that allocates the operating address to the operating device in the luminaire directly upon being actuated.

FIG. 1 shows an exemplary embodiment in accordance with the invention.

The short address (operating address) of each operating device is transmitted via an interface that is also configured to connect a daylight sensor and/or ambient light sensor. Once the light sensor is connected, the operating device can selectively be set into an operating address allocation mode in the light signals are transmitted in digitally coded form to the light sensor and are decoded via the operating device in this mode as an allocated operating address, and stored.

This therefore constitutes an example of a digital transmission of an operating address via a light sensor input of an operating device for luminous means.

The sequence of digital light pulses follows a digital frame (for example with the structure PREAMBLE—ADDRESS DATA—CHECK). The frame is constructed in such a way that no unintended programming of an address can be performed.

As mentioned, the operating device can be set into a programming or address allocation mode (manually or by a selective or broadcast bus command). In this mode, the operating device then waits for the receipt of a data frame.

After successful data transmission, the operating device confirms the successful data transmission, for example by modulation of the intensity of the connected luminous means (dimming), acoustically, by means of an optical display (status diode etc.), etc.

An example of a possible installation sequence is as follows:
(1) Specify an operating address for each luminaire in an installation plan (building plan).
(2) As described above, program the associated operating devices in the luminaires.
(3) Send all further parameters, for example via a DALI bus by using the operating address.

This therefore constitutes an example of a digital transmission of an operating address via a light sensor input of an operating device for luminous means.

The light sensor can both be an active light sensor that is supplied with a voltage and emits a preferably digital signal as an item of brightness information, and a passive light sensor such as, for example, an LDR. An LDR is a light-dependent resistor that can change its resistance value as a function of brightness. This change in resistance can, for example, be monitored by applying a voltage to the LDR and in this case monitoring the current set by the LDR. The provision of the voltage for the LDR, and the monitoring of the current through the LDR can be performed by the operating device.

The allocation of the operating address can, however, also be performed, for example, by virtue of the fact that the respective light sensor is darkened or spotlit once or repeatedly for a certain time. The darkening of the light sensor can be detected, and an operating address can therefore be assigned to the respective operating device. The spotlighting of the light sensor can be performed, for example, by spotlighting with the aid of a pocket lamp. This spotlighting can be detected by the light sensor, and an operating address can therefore be assigned to the respective operating device.

The allocation of the operating address can therefore be performed by manual signaling, for example darkening or spotlighting.

In a further variant, an IR sensor can be used (as infrared sensor, a specific form of light sensor) externally for allocation of the address.

Here, an IR transmitter/receiver (subsequently called a DALI-IR) can be connected to the DALI bus in order thus to permit the control of DALI devices via a conventional or programmable IR remote control. The DALI-IR can be equipped with diverse performance features such as, for example, a scene sequencer or group controller. However, instead of the DALI bus it is also possible to apply any other digital bus such as, for example, DSI, DMX, a power line carrier or Bluetooth.

The DALI-IR can also act as interface between 2 DALI buses.

The DALI-IR can be configured as follows:
1. Sensor configures (teaching) the remote control: the DALI command, which is supplied to the remote control, is transmitted via the DALI bus to the DALI-IR. The latter transmits the command to the learning remote control, which is in the learning mode.
2. Remote control sensor (configures (teaching) requires configuration software):
a key is pressed on the remote control, this being registered by the DALI-IR and the configuration software being informed that an IR signal has been detected. The DALI commands can now be assigned and thus stored in the DALI-IR.

The DALI-IR can be integrated in existing sensor housings, for example light sensor housings.

It is also possible, for example, to transmit in the visible region. In this case, starting from a remote control with a laser or an LED as transmission means, it is possible to transmit a corresponding item of information to a light sensor interface via a daylight sensor or other brightness sensor. Instead of a handheld device in the form of a remote control with a laser or an LED as transmission element, it is, however, also possible to use another device to emit the light, for example a laser pointer or a cell phone with a controllable LED light.

Further Exemplary Embodiment (See Also FIG. 1):

Operating devices that are driven by the so-called DMX bus are normally addressed via rotary switches, a DIP switch or similar mechanical coding. According to the invention, the operating devices are equipped with a radio or infrared receiver or transceiver. The operating devices can be addressed via this receiver. Non-contact addressing is thereby possible (for example at a higher level), and there is no need for additional mechanical interfaces (plugs) for the addressing. It is thus also possible to design closed housings, and thereby to achieve higher IP protection classes.

According to the invention, the devices can therefore be addressed without contact after the installation. Thus, closed housings can be designed (in the case of IR with viewing window), since there is no need for a plug connection.

Use by Means of Digital Signals for Addressing Via the Sensor Input:

A voltage supply at an interface for a light sensor can also be used simultaneously as a serial interface. An active plug can thus be operated such that the plug is firstly supplied with voltage proceeding from the operating device once via the light sensor interface in order to operate a controller in the plug. This controller can then, for its part, output a preprogrammed (stored address) serially to the light sensor input, which can then be interpreted by the operating device. The fact that in this case a sufficiently large buffer must be provided on the plug for the purpose of voltage supply follows from the necessity that the supply voltage is then, after all, always shortcircuited by the controller at logic 0 when the plug transmits, in order to generate a serial protocol.

Such an active plug can, of course, not only output permanently programmed addresses serially; it is also possible thereby to transmit yet further configurations and data. In systems with an interface for keys or switches, it is thereby possible, for example, to provide a simple alternative to the different key press codes. The plug can also be programmed by the user (with a PC or laptop, for example via USB).

Of course, preprogrammed plugs with address printed on could also be made available to the user.

Instead of a light sensor, other sensors such as, for example, movement sensors or noise sensors can be applied in just this way. The operating devices to which the appropriate sensors are connected can in each case be selectively set into a programming mode for carrying out a method to allocate an operating address to the operating device in a luminaire. An appropriate signal such as, for example, a noise (such as, for example, a whistle tone) is then applied to the sensor used in each case so that this sensor can detect this as a signal for the allocation of the operating address.

It would also be possible, in addition, to operate the actual light sensor as specified in parallel with the active plug. The light sensor could be operated as usual in the corresponding pauses of the serial protocol. Any error arising from the plug power supply could, after all, easily be corrected in the software if a plug is present.

The invention claimed is:

1. A method for the allocation of an operating address to an operating device for luminous means using a hand-held device and a daylight sensor, wherein the operating device is communicatively coupled to the daylight sensor, the method comprising:
   allocating an operating address to the operating device by transmitting the operating address in digitally coded form from the hand-held device to the daylight sensor connected to the operating device, wherein the operating address is encoded into and transmitted entirely over a visible light spectrum.

2. The method as claimed in claim 1, further comprising switching the operating device to a programming mode that allows the daylight sensor to receive digitally coded data.

3. The method as claimed in claim 1, wherein directly transmitting the operating address to the daylight sensor comprises spotlighting the daylight sensor repeatedly for a certain time.

4. The method as claimed in claim 1, wherein directly transmitting the operating address to the daylight sensor comprises darkening the daylight sensor repeatedly for a certain time.

5. The method as claimed in claim 1, in which the operating device confirms the successful address allocation and address storage optically, acoustically and/or via a connected bus.

6. The method as claimed in claim 1, in which the handheld device that transmits the optical digital signals is a learning remote control.

7. A system that is configured for carrying out a method as claimed in claim 1.

8. A system comprising an operating device with a light sensor interface configured to perform a method according to any one of claims 1-6, when set into a programming mode.

9. An operating device for luminous means with a daylight sensor that can be set selectively into a programming mode in order to carry out a method as claimed in claim 1.

10. The operating device as claimed in claim 9, characterized in that the operating device can provide a voltage for supplying the daylight sensor.

\* \* \* \* \*